(12) United States Patent
Nishiguchi et al.

(10) Patent No.: US 6,636,253 B2
(45) Date of Patent: Oct. 21, 2003

(54) LIGHT SCANNING APPARATUS

(75) Inventors: Tetsuya Nishiguchi, Nara (JP); Makoto Masuda, Nara (JP); Toshiro Mukai, Yamatotakada (JP); Kenzou Ohkubo, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 13 days.

(21) Appl. No.: 09/910,441

(22) Filed: Jul. 19, 2001

(65) Prior Publication Data

US 2002/0018112 A1 Feb. 14, 2002

(30) Foreign Application Priority Data

Jul. 26, 2000 (JP) ......................................... 2000-225418

(51) Int. Cl.[7] .............................................. B41J 27/00
(52) U.S. Cl. ......................................................... 347/259
(58) Field of Search ................................. 347/259, 260, 347/243, 248; 359/216, 226

(56) References Cited

U.S. PATENT DOCUMENTS

| | | | |
|---|---|---|---|
| 5,365,259 A | | 11/1994 | Kanoto et al. ............... 347/137 |
| 5,930,019 A | * | 7/1999 | Suzuki et al. ................ 359/204 |
| 6,057,953 A | * | 5/2000 | Ang ............................. 359/204 |

FOREIGN PATENT DOCUMENTS

| | | | |
|---|---|---|---|
| JP | 10-213767 A | * | 8/1998 |
| JP | 11-218702 A | * | 8/1999 |

* cited by examiner

*Primary Examiner*—Michael Nghiem
(74) *Attorney, Agent, or Firm*—Renner, Otto, Boisselle & Sklar (57) ABSTRACT

A light scanning apparatus including a beam emitter for emitting a light beam; a multi-facet rotary mirror having a plurality of reflective facets for reflecting the light beam emitted from the beam emitter and rotatable for scanning the light beam reflected on the reflective facets over a scanning object; an incident optical system for shaping the light beam emitted from the beam emitter to allow the light beam to have a greater width than a width of each of the reflective facets of the multi-facet rotary mirror as measured in a scanning direction for overfilled facet illumination and directing the light beam to the multi-facet rotary mirror; and an fθ lens provided in a path of the light beam extending from the multi-facet rotary mirror to the scanning object; wherein the incident optical system comprises deflector configuration provided between the fθ lens and the scanning object for deflecting the light beam emitted from the beam emitter toward the multi-facet rotary mirror so as to cause the light beam deflected by the deflector configuration to pass through an end portion of the fθ lens to reach the multi-facet rotary mirror.

10 Claims, 10 Drawing Sheets

LIGHT SCANNING APPARATUS

CROSS-REFERENCE TO RELATED APPLICATION

This application is related to Japanese Patent Application No. 2000-225418 filed in Jul. 26, 2000, whose priority is claimed under 35 USC §119, the disclosure of which is incorporated by reference in its entirety.

BACKGROUND OF THE INVENTION

1. Field of the Invention

The present invention relates to a light scanning apparatus and, more particularly, to a light scanning apparatus for use in an image forming apparatus, such as a laser printer or a digital copying machine, adapted to record an image on a scanning object by scanning a laser beam over the scanning object for light exposure according to image information.

2. Description of the Related Art

Overfilled-mode light scanning apparatuses are known in which a light beam (incoming beam) having a greater width than the width of each reflective facet of a multi-facet rotary mirror is reflected on the reflective facet and the reflected light beam (outgoing beam) is scanned over a scanning object (see, for example, Japanese Unexamined Patent Publications No. 11-218702 (1999) and No. 10-213767 (1998)). There are two types of overfilled-mode light scanning apparatuses: a center incidence type which is constructed so that the center axis of a scanning plane of the outgoing beam to be directed to the scanning object (scanning angle center axis) is coplanar with the center axis of the incoming beam in a plane extending through the rotation axis of the multi-facet rotary mirror (rotation axis plane) and the incoming beam and the outgoing beam are both allowed to pass through an fθ lens; and an oblique incidence type which is constructed so that the center axis of the incoming beam and the scanning angle center axis of the outgoing beam are present in different rotation axis planes of the multi-facet rotary mirror and only the outgoing beam but not the incoming beam is allowed to pass through the fθ lens.

The overfilled-mode light scanning apparatus of center incidence type has a light source and an incident optical system including an optical component for shaping the incoming beam into a rectangular cross section, a deflection mirror for deflecting the incoming beam before incidence on the fθ lens, and the like. The incident optical system is disposed generally perpendicularly to tandem arrangement of the multi-facet rotary mirror and the fθ lens, so that the light scanning apparatus has a great projection extending along the length of the incident optical system. This is disadvantageous in housing design with a lot of dead spaces in an apparatus housing, which may needlessly occupy a space in an image forming apparatus employing the light scanning apparatus. This results in the size increase of the light scanning apparatus and the image forming apparatus thereby to deteriorate the design flexibility thereof.

In the overfilled-mode light scanning apparatus of oblique incidence type, the incoming beam is deflected by a deflection mirror and directly incident on the multi-facet rotary mirror not via the fθ lens. Therefore, an incident optical system is disposed as extending in an opposite direction from the traveling direction of the outgoing beam reflected on the multi-facet rotary mirror. Accordingly, the light scanning apparatus also has a partial projection with a dead space in an apparatus housing. This results in the size increase of the light scanning apparatus and an image forming apparatus employing the same, thereby deteriorating the design flexibility thereof.

In the overfilled-mode light scanning apparatus of oblique incidence type, the multi-facet rotary mirror has a smaller effective reflection width, so that the absolute light amount of a light spot to be scanned in a scanning direction across the scanning object is reduced, resulting in an extremely reduced beam utilization efficiency.

In view of the foregoing, the present invention is directed to a light scanning apparatus which provides a beam utilization efficiency close to that provided by the overfilled-mode light scanning apparatus of center incidence type and has a smaller size.

SUMMARY OF THE INVENTION

In accordance with the present invention, there is provided a light scanning apparatus which comprises: beam emitting means for emitting a light beam; a multi-facet rotary mirror having a plurality of reflective facets for reflecting the light beam emitted from the beam emitting means and rotatable for scanning the light beam reflected on the reflective facets over a scanning object; an incident optical system for shaping the light beam emitted from the beam emitting means to allow the light beam to have a greater width than the width of each of the reflective facets of the multi-facet rotary mirror as measured in a scanning direction for overfilled facet illumination and guiding the light beam to the multi-facet rotary mirror; and an fθ lens provided in a path of the light beam extending from the multi-facet rotary mirror to the scanning object; wherein the incident optical system includes deflection means provided between the fθ lens and the scanning object for deflecting the light beam emitted from the beam emitting means toward the multi-facet rotary mirror so as to cause the light beam deflected by the deflection means to pass through an end portion of the fθ lens to reach the multi-facet rotary mirror.

DETAILED DESCRIPTION OF THE INVENTION

A light scanning apparatus according to the present invention comprises: beam emitting means for emitting a light beam; a multi-facet rotary mirror having a plurality of reflective facets for reflecting the light beam emitted from the beam emitting means and rotatable for scanning the light beam reflected on the reflective facets over a scanning object; an incident optical system for shaping the light beam emitted from the beam emitting means to allow the light beam to have a greater width than the width of each of the reflective facets of the multi-facet rotary mirror as measured in a scanning direction for overfilled facet illumination and guiding the light beam to the multi-facet rotary mirror; and an fθ lens provided in a path of the light beam extending from the multi-facet rotary mirror to the scanning object; wherein the incident optical system includes deflection means provided between the fθ lens and the scanning object for deflecting the light beam emitted from the beam emitting means toward the multi-facet rotary mirror so as to cause the light beam deflected by the deflection means to pass through an end portion of the fθ lens to reach the multi-facet rotary mirror.

The beam emitting means includes, for example, a laser light source, and a modulator for modulating the emitted laser beam in accordance with image data.

The multi-facet rotary mirror typically has 12 to 15 reflective facets and is driven by a motor.

The incident optical system includes an optical component for shaping the light beam from the beam emitting means to allow the light beam to have a width sufficient to irradiate the multi-facet rotary mirror more widely than the width of the reflective facet as measured in the scanning direction. For example, the incident optical system consists of various types of lenses, an aperture plate for shaping a beam section, and the like. Usable as the deflection means is a plane mirror.

The fθ lens serves to guide the light beam reflected by the multi-facet rotary mirror to the scanning object to convert constant angular velocity movement of the light beam into constant linear velocity movement on the scanning object. Any conventionally known fθ lens may be used as the fθ lens.

The beam emitting means and the incident optical system may each have an optical axis substantially parallel to an optical axis of the fθ lens.

The light scanning apparatus may further comprise a synchronization detection sensor, and a synchronization mirror for reflecting a part of the light beam reflected by the multi-facet rotary mirror via the fθ lens to the synchronization detection sensor. In this case, the synchronization detection sensor may be disposed in the vicinity of the beam emitting means.

The beam emitting means and the incident optical system may be disposed in such a positional relation that a path of the light beam extending from the deflection means to the fθ lens vertically overlaps a scanning range of the light beam extending from the fθ lens to the scanning object.

The beam emitting means and the incident optical system may be disposed in such a positional relation that a path of the light beam extending from the beam emitting means to the deflection means traverses a path of the light beam extending from the fθ lens to the scanning object.

The beam emitting means may be a laser light source.

The incident optical system may include a collimator lens, a concave lens, a plate having a generally rectangular aperture elongated in the scanning direction, a cylindrical lens, a deflection mirror, and the fθ lens.

The deflection means may be a plane mirror.

The scanning object may be a photoreceptor.

The present invention also provides an image forming system employing the aforesaid light scanning apparatus.

Figure 1:
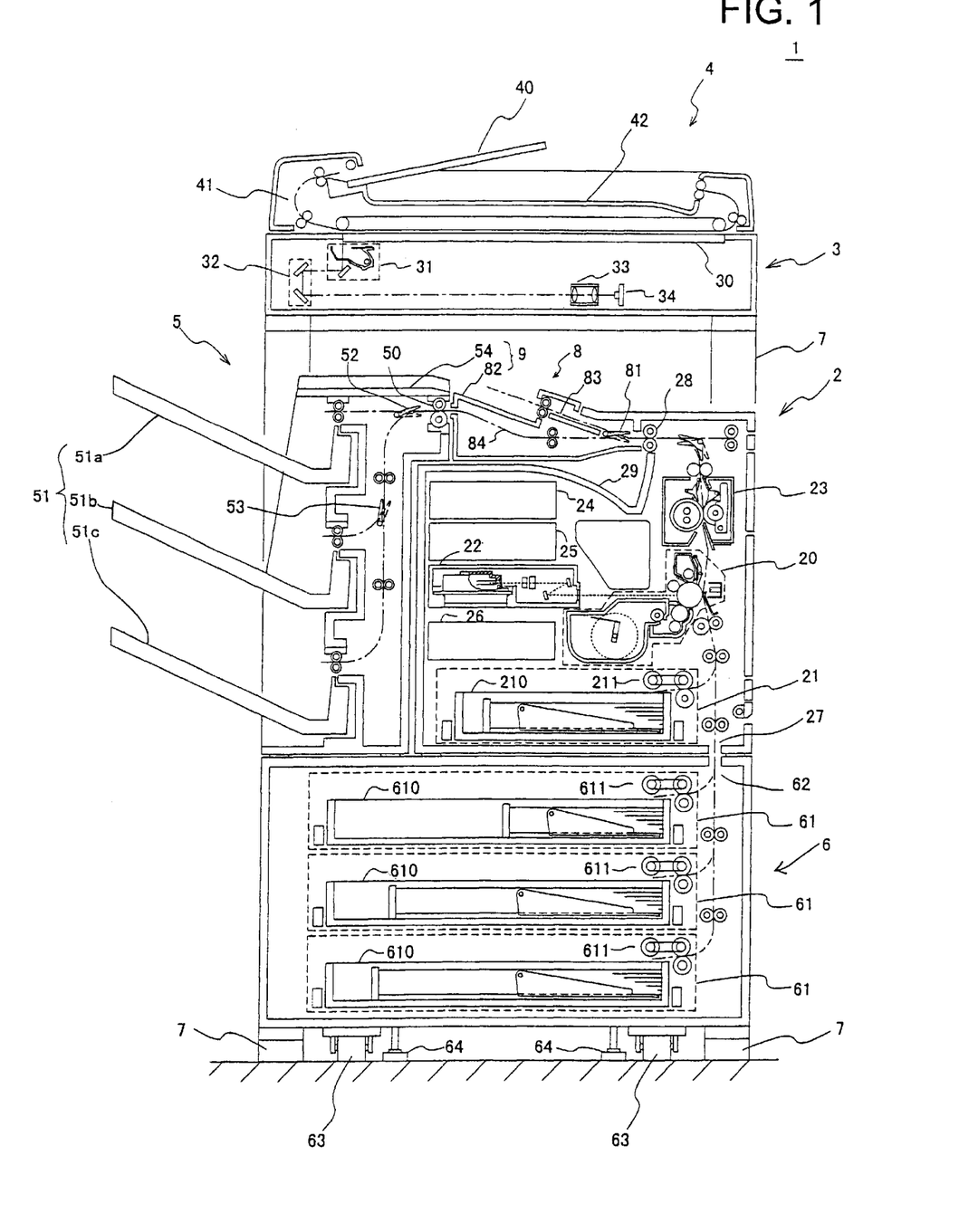
FIG. 1 is a diagram illustrating the construction of an image forming system employing a light scanning apparatus according to the present invention.
Figure 2:
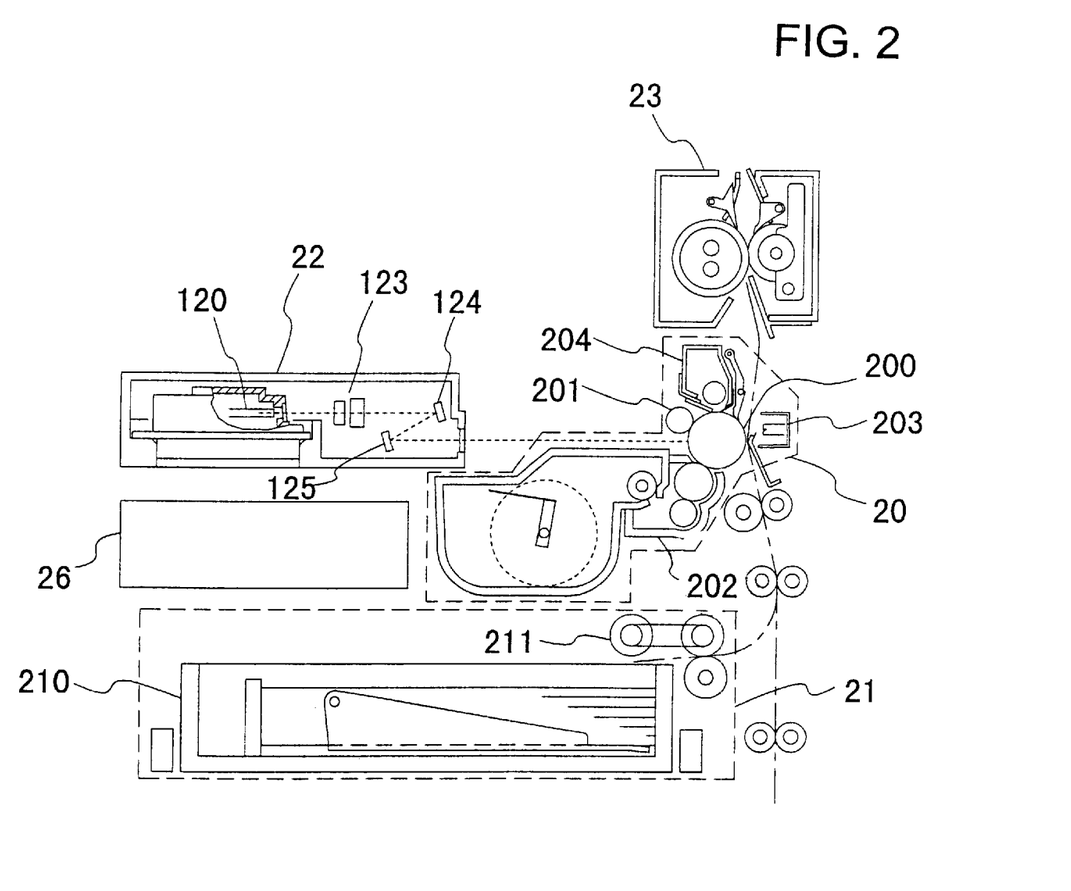
FIG. 2 is an enlarged diagram illustrating major portions of the image forming system shown in FIG. 1.

With reference to FIGS. 1 and 2, the image forming system employing the inventive light scanning apparatus will hereinafter be described by way of embodiment.

FIG. 1 is a sectional view illustrating the construction of the image forming system 1. FIG. 2 is a detailed diagram illustrating a structure around a photoreceptor of the image forming system.

As shown in FIG. 1, the image forming system 1 includes a printer 2, a scanner 3, an automatic document feeder 4, a sheet post-processor 5, a multi-stage sheet feeding unit 6, and an intermediate transportation unit 8. The scanner 3 and the automatic document feeder 4 provided on the top of the scanner are supported by a system rack 7, and disposed above the printer 2 and the sheet post-processor 5.

An explanation will hereinafter be given to the respective components of the image forming system.

The printer 2 prints out an image read by the scanner 3 and, if an external image processing apparatus such as a personal computer is connected to the image forming system, image data inputted from the external apparatus as well.

The printer 2 includes an electrophotographic processing section 20 provided at a right-side middle position in the system. As shown in FIG. 2, the electrophotographic processing section 20 includes a photoreceptor 200, and a charging roller 201 for uniformly charging a surface of the photoreceptor 200, a light scanning unit 22 for forming an electrostatic latent image by scanning a light spot over the uniformly charged photoreceptor 200, a developing unit 202 for developing the electrostatic latent image formed on the photoreceptor by the light scanning unit 22 with a developer, a transfer unit 203 for transferring an image developed on the photoreceptor 200 onto a sheet, and a cleaning unit 204 for removing residual developer from the photoreceptor 200 (and optionally a charge removing lamp unit), which are disposed around the photoreceptor 200 in this order.

The printer 2 further includes a sheet feeder 21 provided at the bottom thereof. The sheet feeder 21 includes a sheet tray 210 for retaining sheets, and separate sheet feeding means 211 for separately feeding the sheets out of the sheet tray 210 on a one-by-one basis. The sheets separately fed from the sheet feeder 21 are each transported around the photoreceptor 200 to the transfer unit 203 in the electrophotographic processing section 20, whereby an image developed on the photoreceptor 200 is transferred onto a sheet. For replenishment of sheets in the sheet feeder 21, the sheet tray 210 is drawn forwardly of the printer 2.

As shown in FIG. 1, a sheet reception port 27 is provided in the bottom surface of the printer 2 for receiving a sheet transported from the multi-stage sheet feeding unit 6 provided externally of the printer 2 and transporting the sheet around the photoreceptor 200 to the transfer unit 203 in the electrophotographic processing section 20.

A fixation unit 23 is provided above the electrophotographic processing section 20, and is adapted to receive the image-transferred sheet, then fix the image of the developer on the sheet by heat and pressure, and output the sheet. The image-fixed sheet is transported from an output roller 28 of the printer 2 to the intermediate transportation unit 8 provided on the printer 2.

Provided above the light scanning unit 22 are a printer controlling section 24 having a process control unit (PCU) board for controlling an electrophotographic process and an interface board for receiving image data from the outside, and an image controlling section 25 having an imaging control unit (ICU) board for performing a predetermined image processing operation on the image data received from the interface board and causing the light scanning unit 22 to scan over the photoreceptor for imaging on the photoreceptor. The printer 2 further includes a power source unit 26 for supplying power to the respective boards and units.

As shown in FIG. 1, the multi-stage sheet feeding unit 6 is an external sheet feeding unit for separately feeding sheets out of sheet trays 610 on a one-by-one basis via separate sheet feeding means 611 and transporting the sheets toward a sheet outlet port 62 provided in a top surface of the unit 6 in communication with the sheet reception port 27. In this embodiment, the multi-stage sheet feeding unit 6 includes three sheet feeders 61 stacked one on another. In the operation of the system, the three sheet feeders 61 are selectively operated to feed a desired type of sheets.

For replenishment of sheets in the sheet feeders 61, the sheet trays 610 are drawn forwardly of the unit 6.

The multi-stage sheet feeding unit 6 is constructed so that the printer 2 and the sheet post-processor 5 are stacked thereon, and has casters 63 and stoppers 64 provided on the bottom thereof so that the multi-stage sheet feeding unit 6 can be transported in this state and fixed in the system rack 7. For the transportation, the stoppers 64 are turned up to be spaced from the floor. For the fixing of the multi-stage sheet feeding unit 6, the stoppers are turned down to be brought into contact with the floor.

In this embodiment, the multi-stage sheet feeding unit includes the three sheet feeders 61 stacked one on another, but may include at least one sheet feeder 61 or more than three sheet feeders 61.

The sheet post-processor 5 is adapted to perform post-processing operations on image-formed sheets introduced out of the printer 2 via the intermediate transportation unit 8 provided thereabove by a feed-in roller as shown in FIG. 1.

The post-processing operations include a stapling operation, a sorting operation and the like. The post-processor herein shown includes three sheet output trays 51 (51a, 51b, 51c), and is adapted to output the sheets selectively onto the sheet output trays 51 by switching gates 52, 53 as required. For example, the upper sheet output tray 5 a may be used for outputting sheets in a copy mode, and the middle sheet output tray 51b may be used for outputting sheets in a print mode. The lower sheet output tray 51c may be used for outputting sheets in a facsimile printing mode. Thus, the sheets can be sorted in the sheet output trays depending on the mode.

The scanner 3 is operative in an automatic reading mode in which document originals in a sheet form are automatically fed on a one-by-one basis by the automatic document feeder 4 as shown in FIG. 1 for successively reading images of the document originals by light scanning, and in a manual reading mode in which a document original in a book form or in a sheet form not suitable for automatic feeding by the automatic document feeder 4 is manually set for reading an image of the document original. An image of a document original placed on a transparent document platen 30 is irradiated with light scanned by a first scanning unit 31 and a second scanning unit 32 which are movable across the document platen 30 at predetermined relative speeds, and the light is guided by optical components such as a mirror and a focusing lens 33 to be focused on a photoelectric converting device 34. Thus, the document original image is converted into electric signals (image data), which are in turn outputted.

The automatic document feeder 4 includes document transporting means 41, as shown in FIG. 1, for successively feeding document originals out of a document tray 40 toward the document platen 30 and, after the scanning, discharging the document originals onto a document discharge tray 42. The automatic document feeder 4 is hinged to the scanner pivotally about a rear edge thereof in an upwardly openable manner, so that a document original not suitable for the automatic feeding can be placed on the document platen 30 for the scanning.

The intermediate transportation unit 8 is provided above a sheet discharge tray 29 disposed on the top of the printer 2, and is adapted to guide the image-formed sheet discharged from the printer 2 toward the sheet post-processor 5 positioned downstream of the printer 2.

The intermediate transportation unit 8 has a sheet transportation path 84 which is branched into another sheet transportation path 83 for guiding the sheet to a sheet discharge tray 9 defined by an upper surface 82 of the unit 8 and an upper surface 54 of the sheet post-processor 5. The two sheet transportation paths are switched by switching a gate 81 provided at a branch point therebetween.

The light scanning unit 22 according to the present invention will hereinafter be described in detail with reference to FIGS. 3 to 8.

Figure 3:
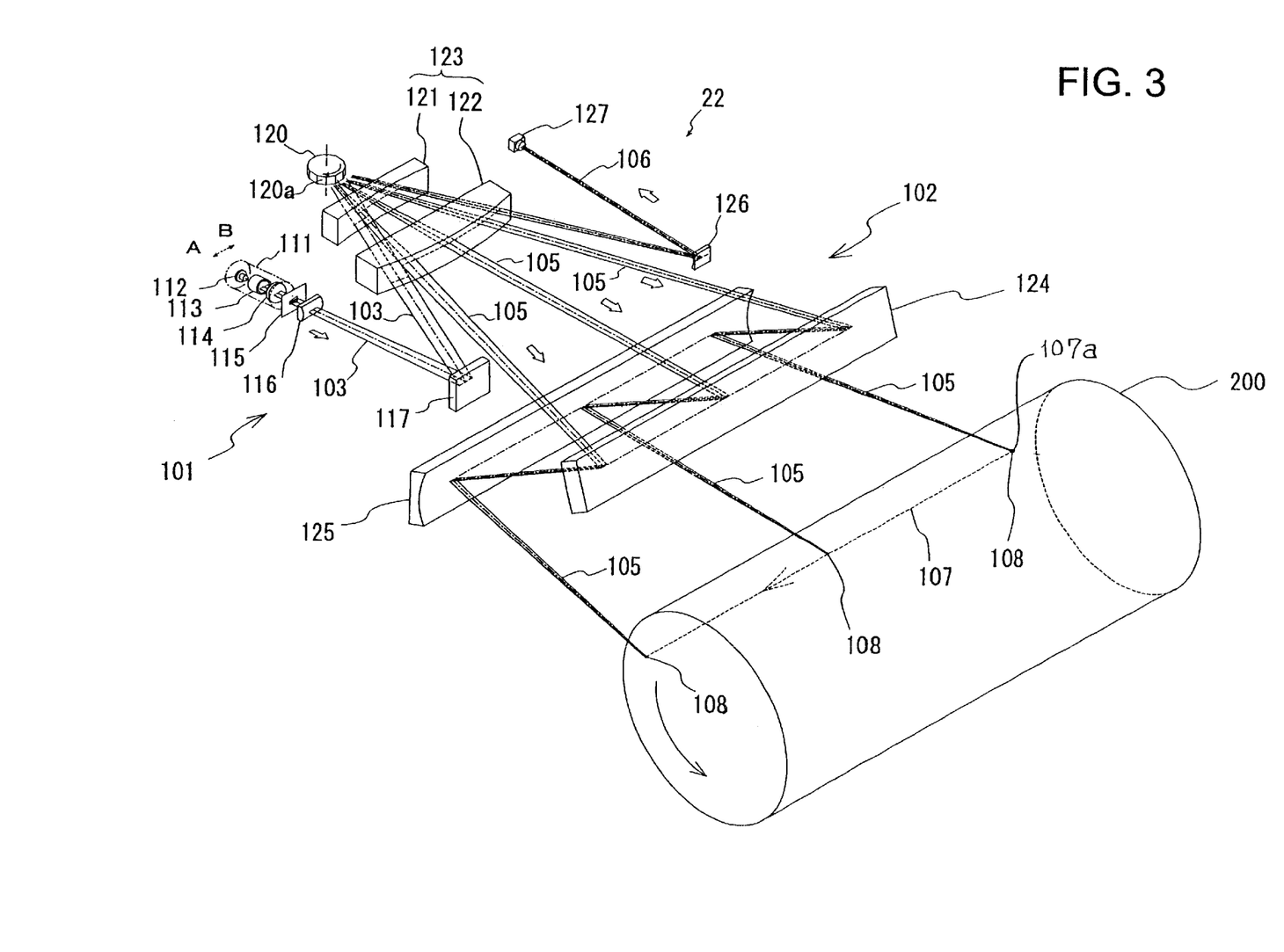
FIG. 3 is a perspective view illustrating the construction of a light scanning apparatus according to an embodiment of the present invention.
Figure 4:
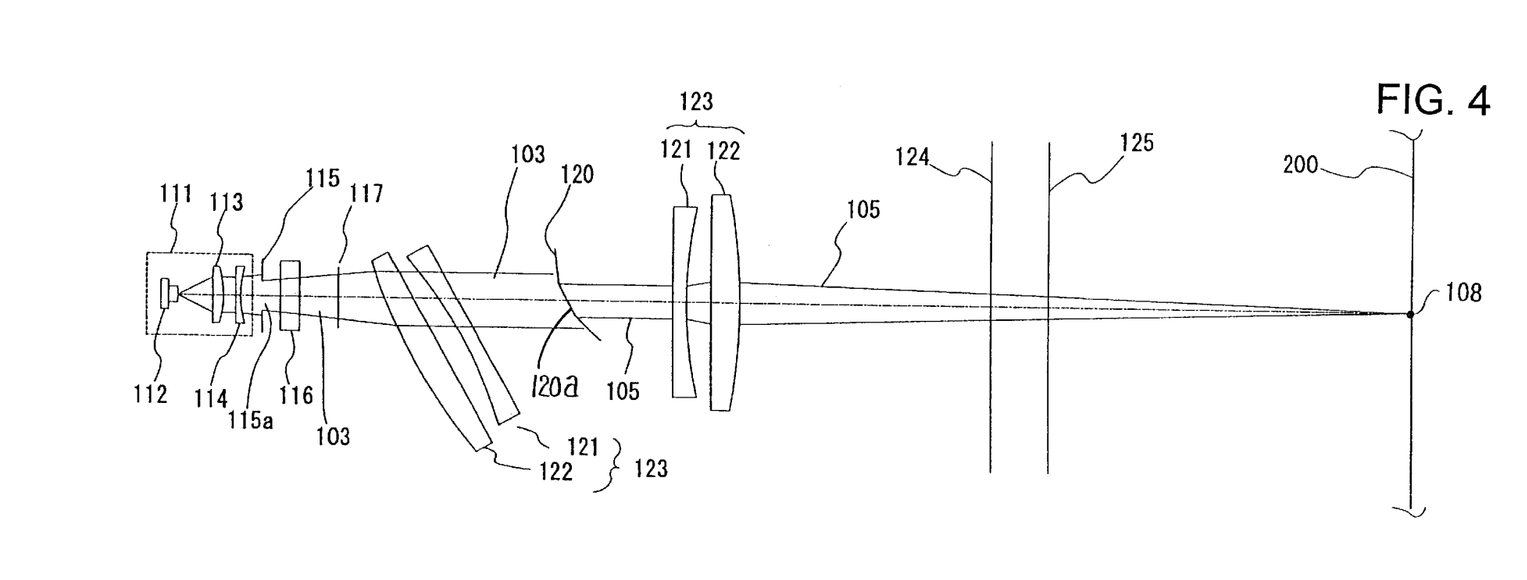
FIG. 4 is a plan view illustrating an optical path in accordance with the embodiment of FIG. 3.
Figure 5:
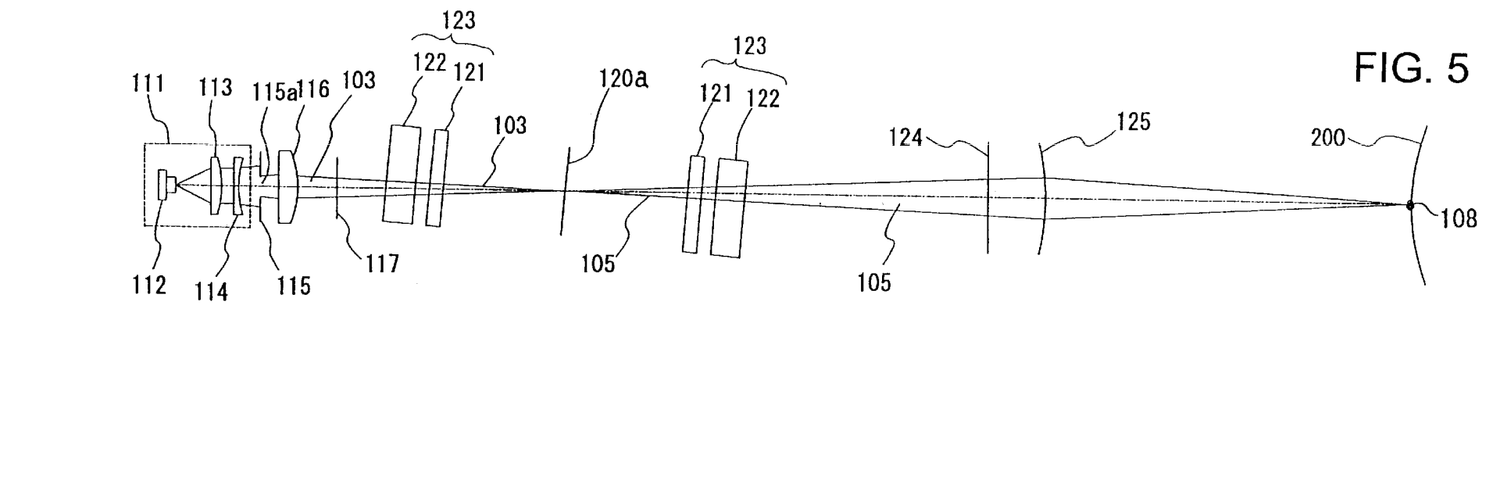
FIG. 5 is a side view illustrating the optical path in accordance with the embodiment of FIG. 3.
Figure 6:
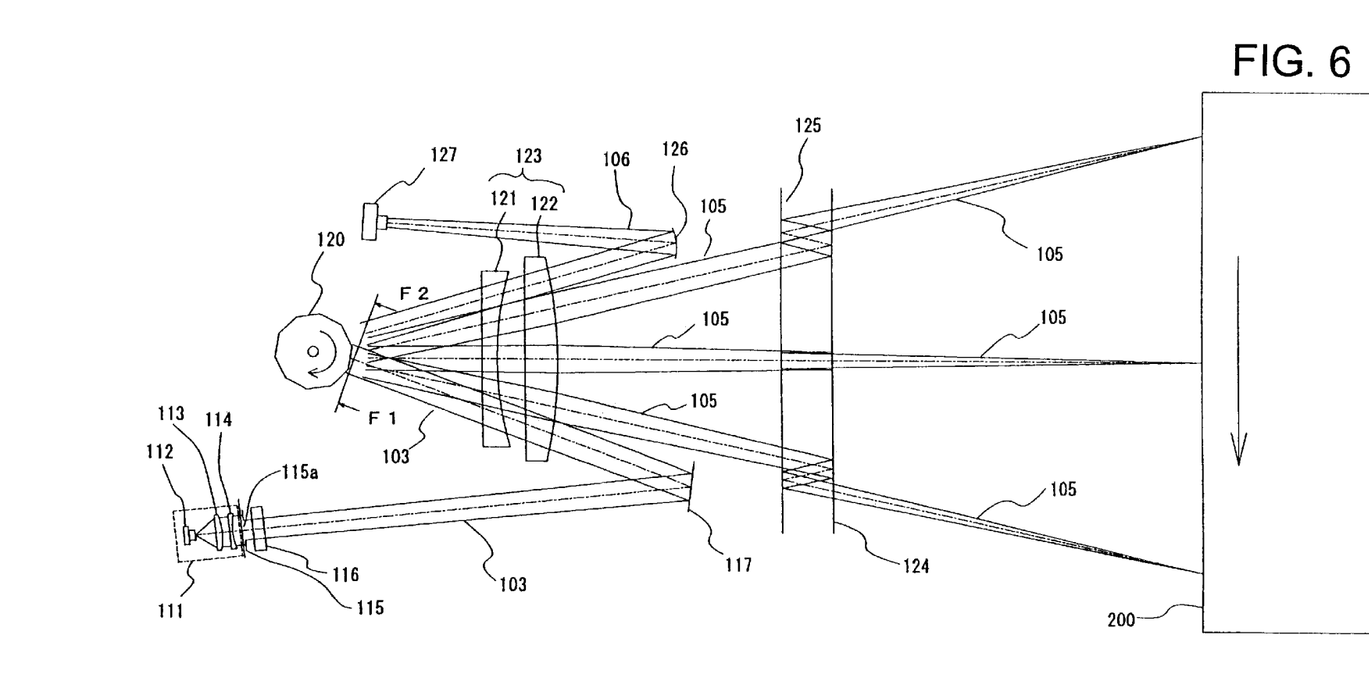
FIG. 6 is a plan view illustrating the embodiment of FIG. 3.
Figure 7:
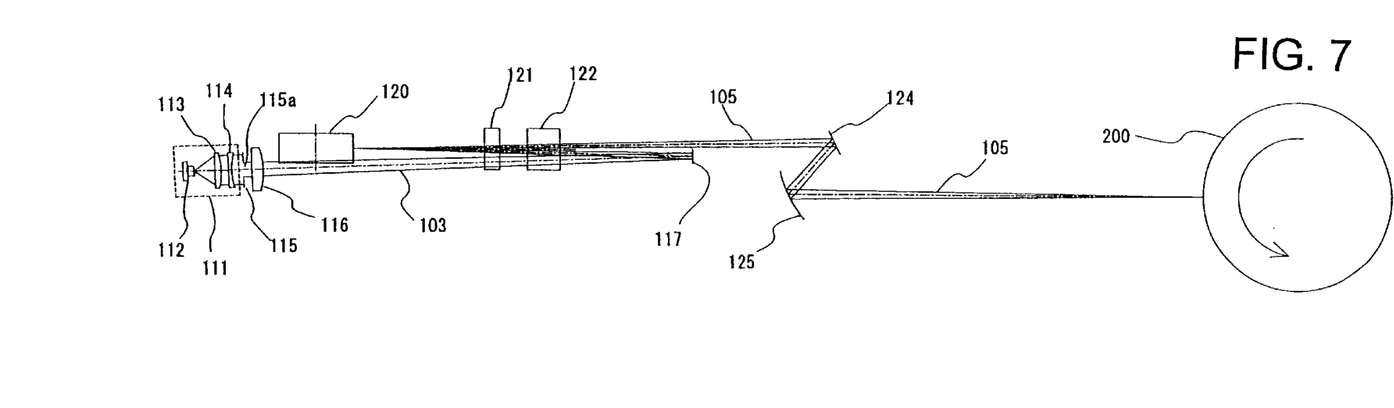
FIG. 7 is a side view illustrating the embodiment of FIG. 3.
Figure 8:
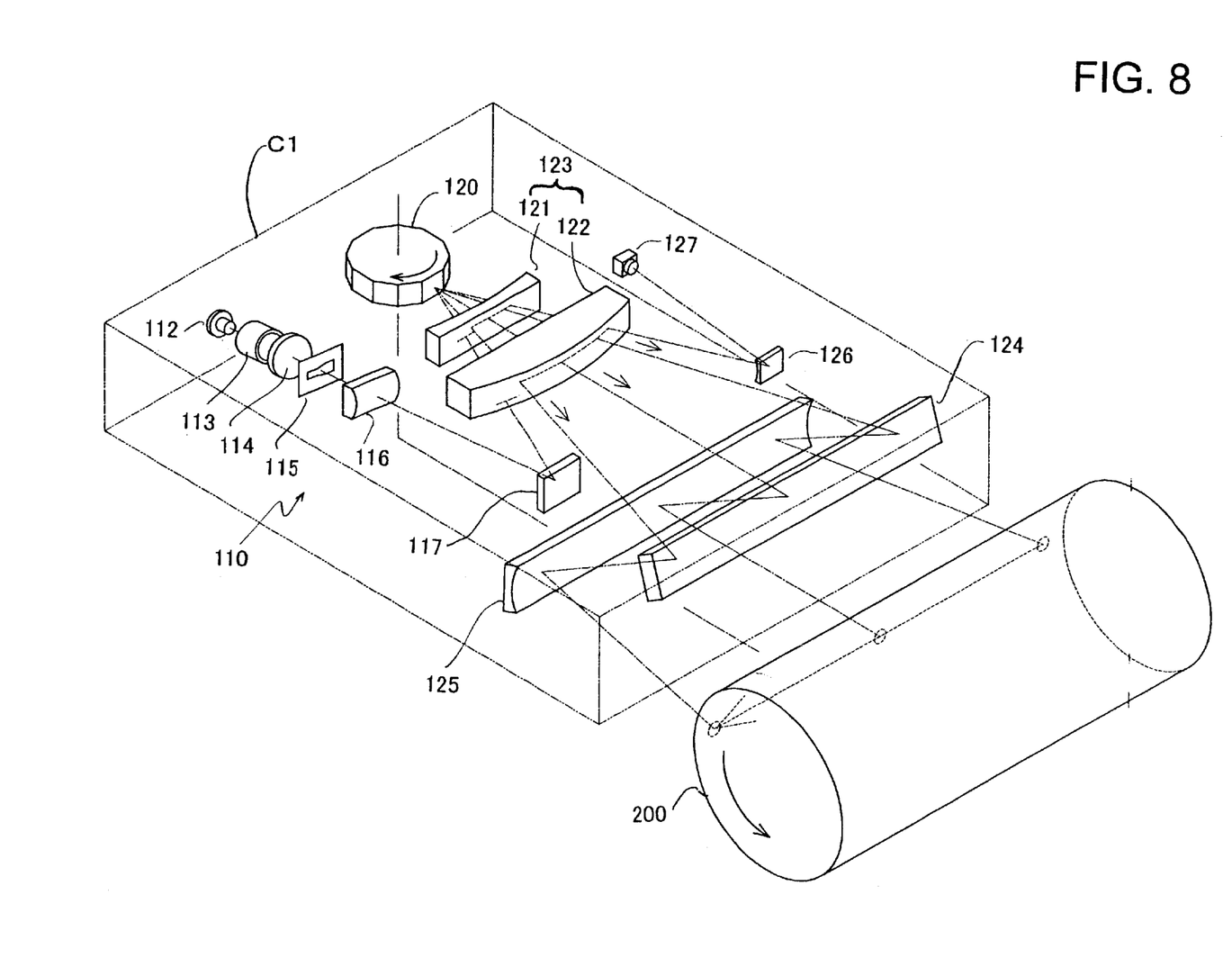
FIG. 8 is a perspective view illustrating a housing in accordance with the embodiment of FIG. 3.

FIG. 3 is a perspective view illustrating major components of the light scanning unit 22 and paths of a light beam. FIGS. 4 and 5 illustrate optical paths 103 and 105 in a plan view and in a side view, respectively, for explaining the functions of the major components of the light scanning unit 22, assuming that the major components are arranged linearly. FIGS. 6 and 7 are a plan view and a side view, respectively, of the light scanning unit 22 shown in FIG. 3, and FIG. 8 is a perspective view illustrating a housing of the light scanning unit 22.

In the light scanning unit 22, as shown in these figures, a light beam 103 (hereinafter referred to as "incoming beam 103") emitted from a semiconductor laser 112 is guided to a multi-facet rotary mirror 120 having a plurality of reflective facets arranged in the direction of rotation thereof, and reflected on the reflective facets of the multi-facet rotary mirror 120 to form a laser beam 105 (hereinafter referred to as "outgoing beam 105"). The outgoing beam 105 is scanned over a scanning object (photoreceptor drum 200). Various optical components are disposed in an optical path extending from the semiconductor laser 112 to the multi-facet rotary mirror 120 (hereinafter referred to as "incoming beam path") and in an optical path extending from the multi-facet rotary mirror 120 to the photoreceptor 200 (hereinafter referred to as "outgoing beam path"). Optical components disposed in the incoming beam path are herein referred to as an incident optical system 101, while optical components disposed in the outgoing beam path are herein referred to as a projection optical system 102.

The incident optical system 101 is adapted to guide the incoming beam 103 emitted from the semiconductor laser 112 to the multi-facet rotary mirror 120 and to shape the incoming beam 103 into a generally rectangular cross section having a width greater than the width of each reflective facet 120a of the multi-facet rotary mirror 120 as measured in a scanning direction. A collimator lens 113 for collimating the laser beam emitted from the semiconductor laser 112, a concave lens 114 for diverging the light beam in the scanning direction, an aperture plate 115 having a generally rectangular aperture formed in a middle portion thereof as elongated in the scanning direction, a cylindrical lens 116, a deflection mirror 117, and an fθ lens 123 including lenses 121 and 122 are arranged in this order in the incoming beam path extending from the semiconductor laser 112 to the multi-facet rotary mirror 120. The semiconductor laser 112, the collimator lens 113, the concave lens 114 and the aperture plate 115 are unified as a beam unit 111, which can be shifted in arrow directions A and B in FIG. 3.

The projection optical system 102 is adapted to guide the outgoing beam 105 reflected on the reflective facet 120a of the multi-facet rotary mirror 120 to the photoreceptor 200 via the fθ lens 123 to form a beam spot 108 having a predetermined size on the photoreceptor 200 and scan the beam spot over the photoreceptor 200 at a constant speed for irradiation of the photoreceptor 200 with the outgoing beam 105. The fθ lens 123, a deflection mirror 124, and a cylindrical mirror 125 for correction of facet inclination of the multi-facet rotary mirror 120 are arranged in this order in the outgoing beam path extending from the multi-facet rotary mirror 120 to the photoreceptor 200.

The incoming beam 103 is reflected by the deflection mirror 117, and passes through one end portion of the fθ lens 123 diagonally upward thereby to be projected onto a vertically middle portion of the reflective facet 120a of the multi-facet rotary mirror 120. The outgoing beam 105 passes through the fθ lens 123 diagonally upward to be guided to the photoreceptor 200 via the deflection mirror 124 and the cylindrical mirror 125. The outgoing beam 105 travels along an optical path horizontally diverged in a fan shape by the movement of the reflective facet 120a due to the rotation of the multi-facet rotary mirror 120a to reach the photoreceptor 200.

The majority of the outgoing beam 105 (hereinafter referred to as "main scanning beam 105") is scanned along a main scanning line 107 in a main scanning direction indicated by a broken line arrow over the photoreceptor 200 for imaging on the photoreceptor 200. During the scanning, the main scanning beam 105 travels in a main scanning beam range. The main scanning beam 105 is periodically scanned along the main scanning line 107, while the photoreceptor 200 is rotated in a sub-scanning direction. Accordingly, the main scanning beam 105 is periodically projected onto different positions of the photoreceptor 200. Therefore, the main scanning beam should be synchronized with the rotation of the multi-facet rotary mirror so that the main scanning beam 105 can assuredly be projected at the same start point 107a on the main scanning line 107 whenever the main scanning is started on the photoreceptor 200. To generate a signal for the synchronization, the outgoing beam 105 is sampled as a synchronization detection beam 106. The synchronization detection beam 106 passes through the other end portion of the fθ lens 123, and then reflected apart from the multi-facet rotary mirror 120 by a synchronization beam deflection mirror 126 having a concave reflective surface thereby to be guided to a synchronization detection sensor 127.

More specifically, the incoming beam 103 emitted from the semiconductor laser 112 in a generally conically divergent manner is collimated by the collimator lens 113 as shown in FIGS. 4 and 5. The collimated incoming beam 103 has a generally round cross section. Thereafter, the incoming beam 103 passes through the concave lens 114 thereby to be diverged in a generally round cross section. Subsequently, the incoming beam 103 passes through the aperture 115a of the aperture plate 115 thereby to have a rectangular cross section. Then, the incoming beam 103 is incident on the cylindrical lens 116, whereby the incoming beam 103 is kept diverged in a direction parallel to a generating line of the cylindrical lens 116 a shown in FIG. 4 but converged in a direction perpendicular to the generating line of the cylindrical lens 116. Then, the laser beam 103 passes diagonally upward through the one end portion of the fθ lens 123 thereby to be shaped into a beam which is parallel as viewed in plan in FIG. 4 and convergent as viewed from the side in FIG. 5, and is incident on the reflective facet 120a of the multi-facet rotary mirror 120. The incoming beam 103 is converged on the vertically middle portion of the reflective facet 120a of the multi-facet rotary mirror 120 as viewed from the side, and has a greater width than the width of the reflective facet 120a of the multi-facet rotary mirror 120 as measured in the rotation direction of the rotary mirror. As the reflective facet 120a is moved by the rotation of the rotary mirror, different portions of the incoming beam 103 are reflected by the reflective facet 120a, so that the outgoing beam 105 is protected in different directions.

The outgoing beam 105 reflected on the reflective facet 120a of the multi-facet rotary mirror 120 toward the fθ lens 123 is parallel as viewed in plan and divergent as viewed from the side. The outgoing beam 105 passes diagonally upward through the fθ lens 123 thereby to be converged to be focused on the photoreceptor 200 as viewed in plan and diverged as viewed from the side. Then, the main scanning beam out of the outgoing beam 105 is reflected on the deflection mirror 124 and then on the cylindrical mirror 125 thereby to be directed to the photoreceptor 200. The main scanning beam 105 reflected on the cylindrical mirror 125 is kept convergent as viewed in plan, and converged on the photoreceptor 200 as viewed from the side. Thus, the main scanning beam 105 forms a beam spot 108 having a predetermined size on the photoreceptor 200. As shown in FIG. 3, the synchronization detection beam 106 out of the outgoing beam 105 is reflected on the synchronization deflection mirror 126 thereby to be converged on a light receiving surface of the synchronization detection sensor 127. The fθ lens 123 further serves to convert the constant angular velocity movement of the outgoing beam 105 caused by the constant angular velocity rotation of the multi-facet rotary mirror 120 into the constant linear movement of the beam spot 108 along the main scanning line 107 on the photoreceptor 200.

Next, an explanation will be given to a light amount distribution (scanning light amount distribution) along the main scanning line 107 on the photoreceptor 200 which may vary depending on how the incoming beam 103 is incident on the reflective facet 120a of the multi-facet rotary mirror 120.

First of all, an explanation will be given to an effective reflection width ratio which is a primary factor influencing the scanning light amount distribution.

Where the path of the outgoing beam 105 extending from the reflective facet of the multi-facet rotary mirror to a midpoint of the main scanning line 107 on the photoreceptor 200 forms an angle (hereinafter referred to as "incidence-to-reflection angle") of 0 degree with respect to the path of the incoming beam extending to the reflective facet of the multi-facet rotary mirror as viewed in plan (in the case of the overfilled-mode light scanning apparatus of center incidence type), the path of the incoming beam 103 extends through the rotation axis of the multi-facet rotary mirror 120. Therefore, the reflective facet 120a of the multi-facet rotary mirror 120 is perpendicular to the path of the outgoing beam 105 extending to the midpoint of the main scanning line on the photoreceptor 200 as viewed in plan, so that the width of the reflective facet (hereinafter referred to as "effective reflection width") as measured perpendicularly to the path of the incoming beam 103 is at the maximum (maximum effective reflection width). It is herein assumed that the effective reflection width ratio (the ratio of the effective reflection width to the maximum effective reflection width) is 1. The effective reflection width ratio is reduced toward an end of the main scanning line 107. Where the incidence-to-reflection angle is 0 degree, the light amount distribution attributed to the effective reflection width ratio is such that the light amount is at the maximum at the midpoint of the main scanning line 107 and is reduced toward the end of the main scanning line 107.

On the other hand, where the incidence-to-reflection angle is not zero degree (in the case of the overfilled-mode light scanning apparatus of oblique incidence type), an angle formed between the reflective facet 120a of the multi-facet rotary mirror 120 and the path of the incoming beam 103 as viewed in plan becomes closer to 90 degrees as the incidence-to-reflection angle becomes closer to 0 degree. When the path of the incoming beam 103 is perpendicular to the reflective facet 120a as viewed in plan, the maximum effective reflection width ratio is provided for the outgoing beam 105 reflected on the reflective facet 120a. As the incidence-to-reflection angle increases, a peak point in the light amount distribution is shifted in the main scanning direction.

The light amount is reduced toward the end of the main scanning line apart from the peak point.

Thus, the primary factor influencing the light amount distribution is the effective reflection width of the reflective facet 120a of the multi-facet rotary mirror 120 as viewed from the photoreceptor 200.

Next, an explanation will be given to a light intensity distribution (beam profile) of the incoming beam 103 which is a secondary factor influencing the scanning light amount distribution.

The incoming beam 103 emitted from the semiconductor laser 112 has a light intensity distribution in its generally round cross section. The light intensity distribution is a Gaussian distribution in which the light intensity is at the maximum at the center of the beam cross section and is reduced toward the periphery of the beam cross section. The light intensity distribution is also present in the incoming beam 103 guided to the multi-facet rotary mirror 120 after the beam has been shaped into a generally rectangular cross section by the incident optical system 101. That is, the scanning light amount distribution varies depending on a region of the light intensity distribution in the incoming beam reflected on the reflective facet 102 of the multi-facet rotary mirror 120 for the scanning along the main scanning line 107.

Therefore, the configuration of the aperture 115a of the aperture plate 115 is determined in consideration of the primary and secondary factors to ensure uniform light amount distribution along the main scanning line with a minimum loss in light amount.

In the light scanning unit 22 according to this embodiment, the projection optical system (including the multi-facet rotary mirror 120, the fθ lens 123 and the photoreceptor 200) is disposed generally parallel to the incident optical system (including the collimator lens 113, the concave lens 114, the aperture plate 115, the cylindrical lens 116 and the deflection mirror 117) as shown in FIG. 6, so that the projection optical system and the incident optical system are accommodated within the length of the mirrors 124, 125. Therefore, the light scanning unit 22 can be housed in a compact housing C1 as shown in FIG. 8.

Figure 12:
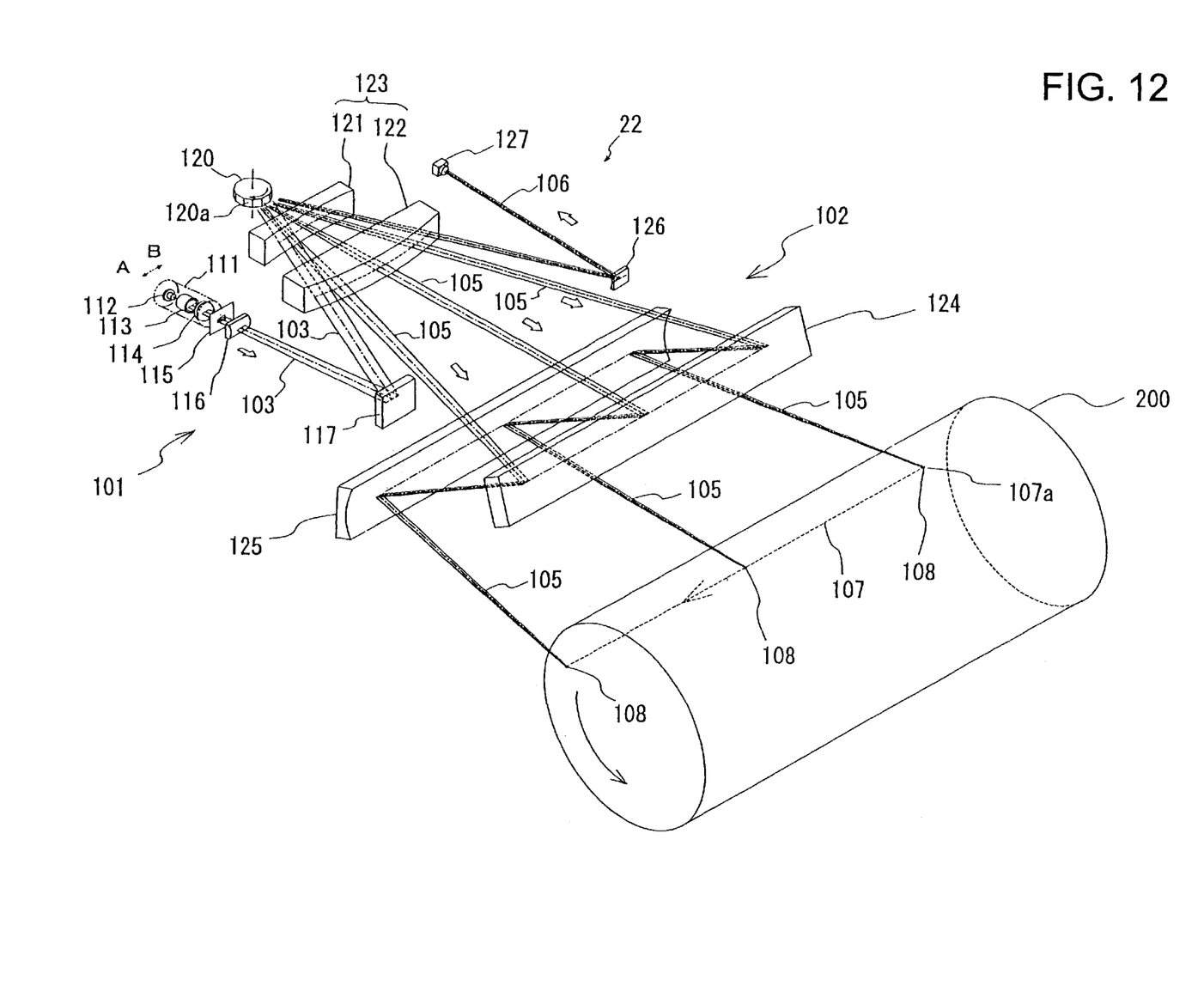
FIG. 12 is a perspective view illustrating the construction of the light scanning apparatus according to the embodiment shown in FIG. 2 with a partial alteration in optical path.

In this embodiment, the semiconductor laser and the incident optical system 101 may be disposed in such a positional relation that the path of the incoming beam extending from the deflection mirror 117 to the fθ lens 123 is coplanar with the path of the outgoing beam 105 extending from the fθ lens 123 to the photoreceptor 200 as shown in FIG. 12.

Figure 9:
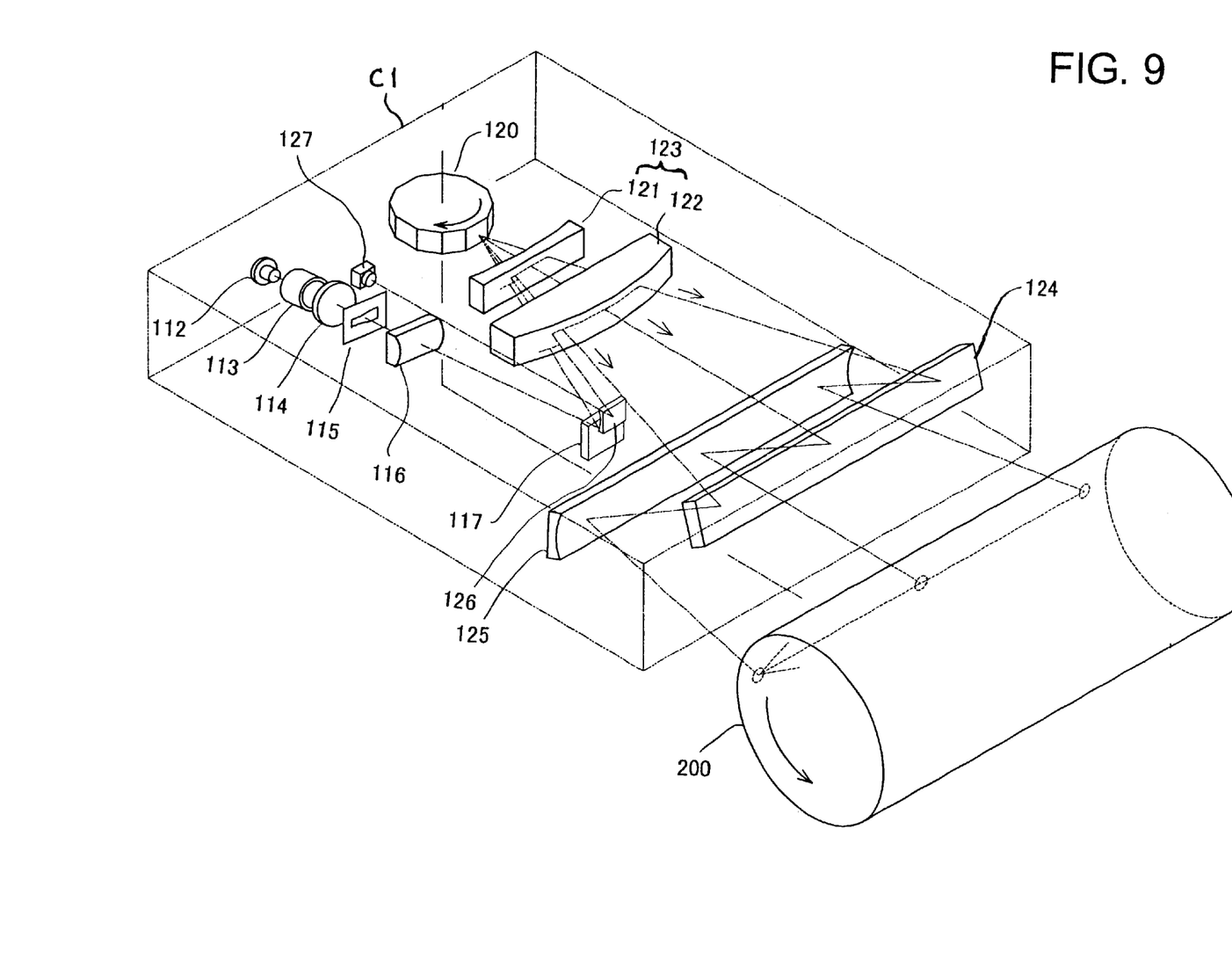
FIG. 9 is a perspective view illustrating a modification of the embodiment of FIG. 3.

FIG. 9 is a perspective view illustrating a modification of the embodiment shown in FIGS. 3 to 8, wherein the positions of the synchronization beam deflection mirror 126 and the synchronization detection sensor 127 are changed. In this modification, the synchronization beam deflection mirror 126 is disposed in the vicinity of the deflection mirror 117, and the synchronization detection sensor 127 is disposed in the vicinity of the semiconductor laser 112. Therefore, part replacement and electric interconnection can easily be carried out.

Figure 10:
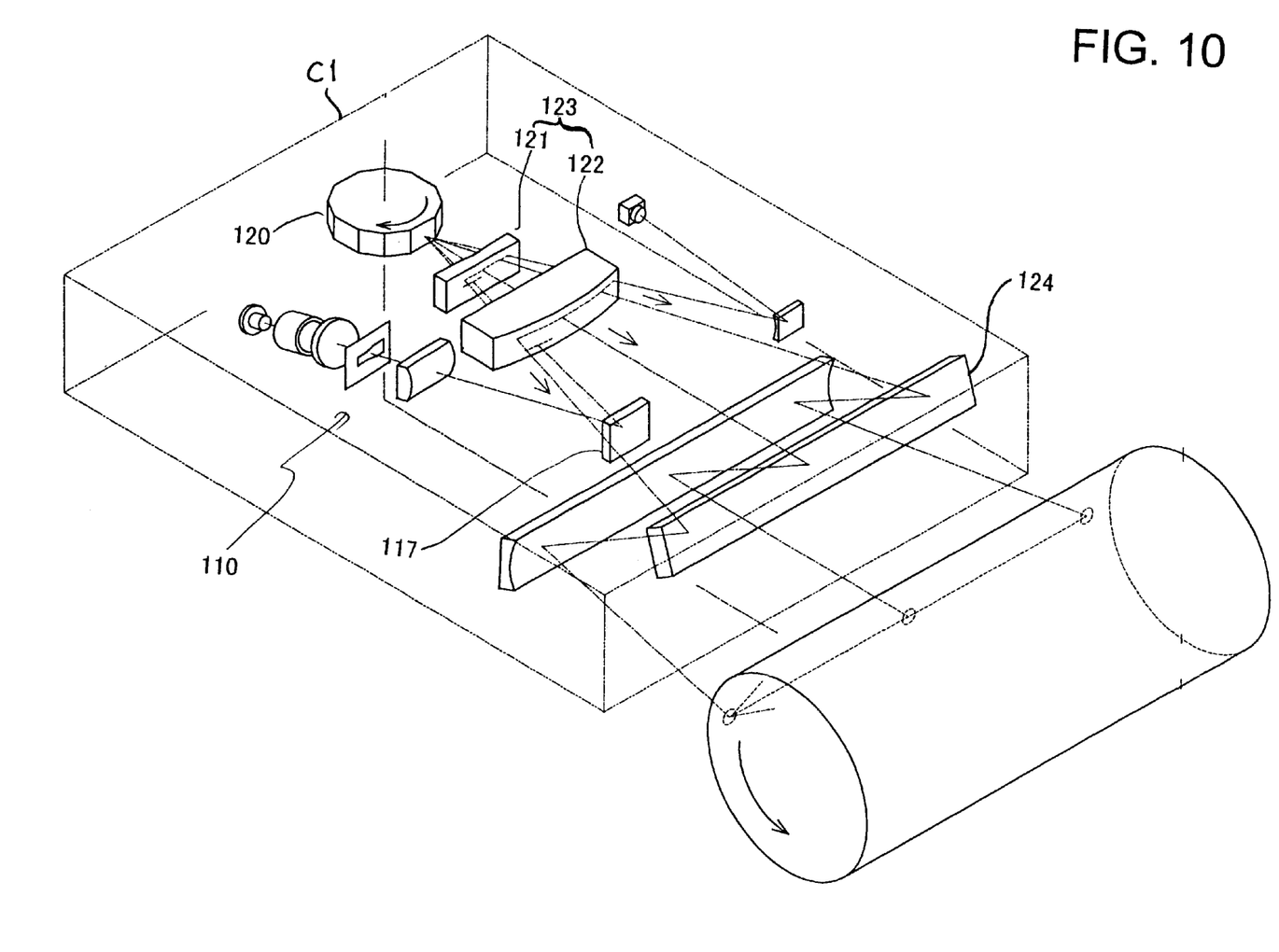
FIG. 10 is a perspective view illustrating another modification of the embodiment of FIG. 3.

FIG. 10 is a perspective view illustrating another modification of the embodiment shown in FIGS. 3 to 8, wherein the optical axis of the incident optical system is disposed closer to the optical axis of the projection optical system. In this modification, the deflection mirror 117 is disposed so that the path of the incoming beam extending from the deflection mirror 117 to the fθ lens 123 vertically overlaps the scanning range of the outgoing beam extending from the fθ lens 123 to the mirror 124.

Figure 11:
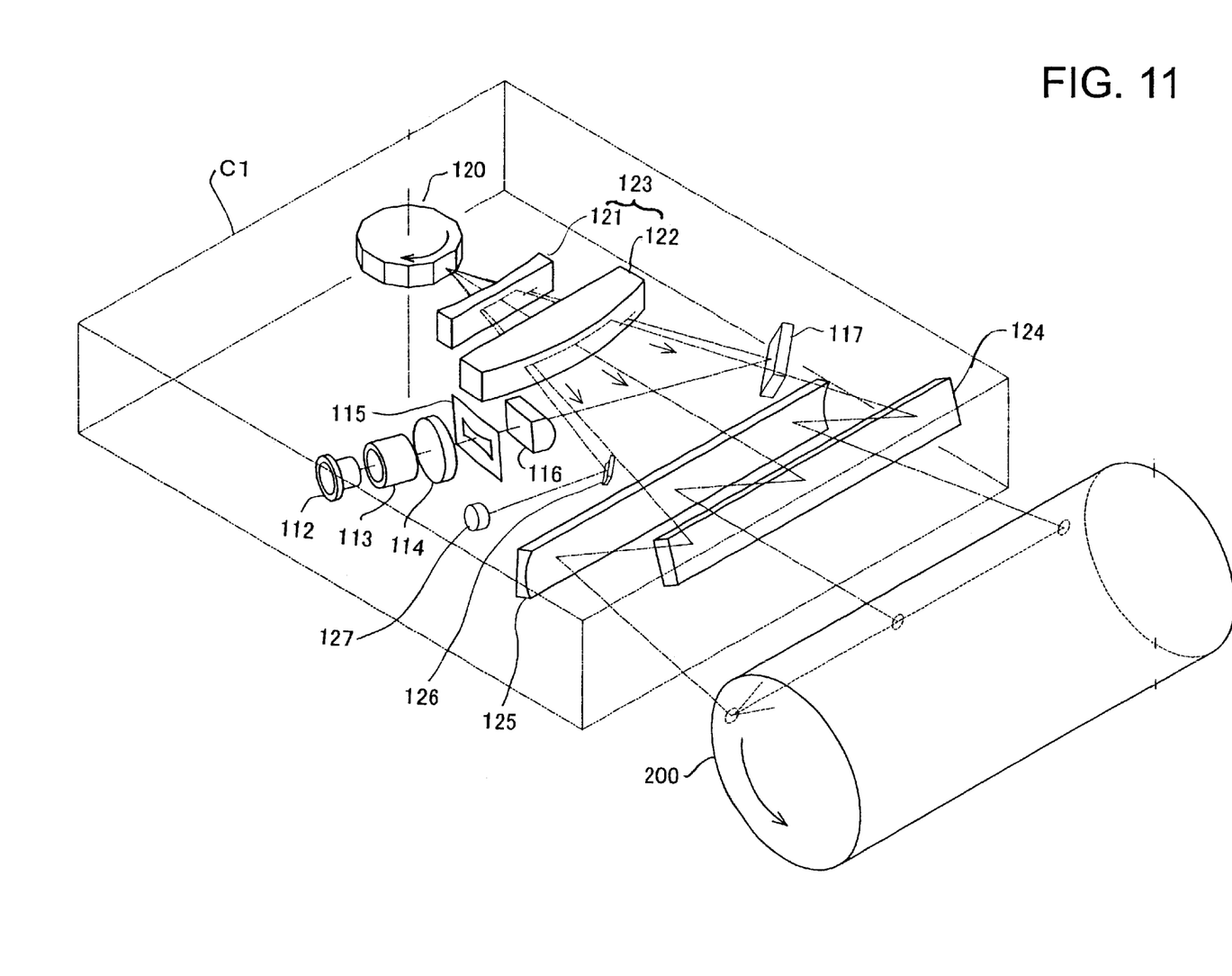
FIG. 11 is a perspective view illustrating further another modification of the embodiment of FIG. 3.

FIG. 11 illustrates further another modification of the embodiment shown in FIGS. 3 to 8, wherein the incident optical system is disposed so that the path of the incoming beam extending from the cylindrical lens 116 to the deflection mirror 117 traversely passes under the path of the outgoing beam extending from the fθ lens 123 to the mirror 124, and the incoming beam is incident on an end portion of the fθ lens 123 from the deflection mirror 117.

With this arrangement, a space required for accommodating the light path extending from the cylindrical lens 116 to the deflection mirror 117 can be shared with the scanning range of the outgoing beam extending from the fθ lens 123 to the mirror 124. Therefore, the housing C1 for housing the unit can be constructed more compactly as shown in FIG. 11.

In accordance with the present invention, the incident optical system is disposed so that the incoming beam incident on the multi-facet rotary mirror from the beam emitting means passes through the one end portion of the fθ lens. Therefore, the light intensity distribution in the light beam to be scanned over the scanning object can be made uniform with a minimum loss. In addition, the optical systems can be accommodated in a more compact space.

What is claimed is:

1. A light scanning apparatus comprising:
   beam emitting means for emitting a light beam;
   a multi-facet rotary mirror having a plurality of reflective facets for reflecting the light beam emitted from the beam emitting means and rotatable for scanning the light beam reflected on the reflective facets over a scanning object;
   an incident optical system for shaping the light beam emitted from the beam emitting means to allow the light beam to have a greater width than a width of each of the reflective facets of the multi-facet rotary mirror as measured in a scanning direction for overfilled facet illumination and directing the light beam to the multi-facet rotary mirror; and an fθ lens provided in a path of the light beam extending from the multi-facet rotary mirror to the scanning object, the fθ lens having two end sides;

wherein the incident optical system comprises deflection means provided between the fθ lens and the scanning object for deflecting the light beam emitted from the beam emitting means toward the multi-facet rotary mirror so as to cause the light beam deflected by the deflection means to pass through an end portion of the fθ lens reach the multi-facet rotary mirror, the end portion being at a location which is closer to one of the end sides than to a middle of the fθ lens.

2. A light scanning apparatus as set forth in claim 1, wherein the beam emitting means and the incident optical system each have an optical axis substantially parallel to an optical axis of the fθ lens.

3. A light scanning apparatus as set forth in claim 1, further comprising a synchronization detection sensor, and a synchronization mirror for reflecting a part of the light beam reflected by the multi-facet rotary mirror via the fθ lens toward the synchronization detection sensor, wherein the synchronization detection sensor is disposed in the vicinity of the beam emitting means.

4. A light scanning apparatus as set forth in claim 1, wherein the beam emitting means and the incident optical system are disposed in such a positional relation that a path of the light beam extending from the deflection means to the fθ lens vertically overlaps a scanning range of the light beam extending from the fθ lens to the scanning object.

5. A light scanning apparatus as set forth in claim 1, wherein the beam emitting means and the incident optical system are disposed in such a positional relation that a path of the light beam extending from the beam emitting means to the deflection means completely traverses a path of the light beam extending from the fθ lens to the scanning object.

6. A light scanning apparatus as set forth in claim 1, wherein the beam emitting means is a laser light source.

7. A light scanning apparatus as set forth in claim 1, wherein the incident optical system comprises a collimator lens, a concave lens, a plate having an aperture elongated in the scanning direction, a cylindrical lens, a deflection mirror as the deflection means, and the fθ lens.

8. A light scanning apparatus as set forth in claim 1, wherein the deflection means is a plane mirror.

9. A light scanning apparatus as set forth in claim 1, wherein the scanning object is a photoreceptor.

10. An image forming system comprising a light scanning apparatus as recited in claim 1.

* * * * *